(12) United States Patent
Robbin et al.

(10) Patent No.: US 7,844,498 B2
(45) Date of Patent: *Nov. 30, 2010

(54) ONLINE PURCHASE OF DIGITAL MEDIA BUNDLES HAVING INTERACTIVE CONTENT

(75) Inventors: Jeffrey L. Robbin, Los Altos, CA (US); David Heller, San Jose, CA (US); Mike Wiese, Cupertino, CA (US); Patrice Gautier, San Francisco, CA (US); Ellis M. Verosub, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1085 days.

This patent is subject to a terminal disclaimer.

(21) Appl. No.: 11/247,974

(22) Filed: Oct. 10, 2005

(65) Prior Publication Data

US 2006/0123052 A1 Jun. 8, 2006

Related U.S. Application Data

(63) Continuation-in-part of application No. 11/138,004, filed on May 25, 2005.

(60) Provisional application No. 60/622,280, filed on Oct. 25, 2004.

(51) Int. Cl.
*G06Q 30/00* (2006.01)
(52) U.S. Cl. ............... 705/26; 705/27; 709/231; 709/236; 707/104.1
(58) Field of Classification Search .............. 705/26, 705/27, 50, 52
See application file for complete search history.

(56) References Cited

U.S. PATENT DOCUMENTS

| | | | |
|---|---|---|---|
| 6,452,609 B1 | 9/2002 | Katinsky et al. | |
| 2002/0091848 A1* | 7/2002 | Agresta et al. | 709/231 |
| 2002/0104019 A1* | 8/2002 | Chatani et al. | 713/201 |
| 2002/0138439 A1* | 9/2002 | Matsushima et al. | 705/52 |
| 2003/0079042 A1* | 4/2003 | Yamanaka et al. | 709/247 |
| 2003/0084460 A1* | 5/2003 | Chung et al. | 725/142 |
| 2003/0101092 A1* | 5/2003 | Fuller et al. | 705/14 |
| 2004/0148424 A1 | 7/2004 | Berkon | |
| 2004/0268451 A1 | 12/2004 | Robbin et al. | |
| 2005/0021478 A1 | 1/2005 | Gautier et al. | |
| 2005/0050345 A1 | 3/2005 | Dowdy et al. | |
| 2005/0102191 A1* | 5/2005 | Heller | 705/26 |
| 2005/0111663 A1* | 5/2005 | Lotspiech et al. | 380/239 |
| 2005/0165843 A1 | 7/2005 | Capps et al. | |
| 2005/0203959 A1 | 9/2005 | Muller et al. | |

(Continued)

OTHER PUBLICATIONS

Author unknown, "EverAd Enables Windows Media Player Users to Download PlayJ-Based Free and Authorized Music," PR Newswire, New York, Jun. 8, 2000, p. 1.*

(Continued)

*Primary Examiner*—Amee A Shah

(57) ABSTRACT

In one embodiment, techniques are provided for interacting with an online media store to obtain a media asset bundle, such as a digital boxset. These techniques involve, for instance, browsing for a media asset bundle that includes at least one interactive playable media asset, purchasing the media asset bundle, obtaining the media assets contained in the media asset bundle, determining if a presentation request has been made for a media asset in the media asset bundle, and presenting the requested media asset.

30 Claims, 11 Drawing Sheets

U.S. PATENT DOCUMENTS

2005/0256770 A1* 11/2005 Popkin et al. .................. 705/14
2006/0089949 A1   4/2006 Robbin et al.
2006/0095339 A1   5/2006 Hayashi et al.

OTHER PUBLICATIONS

Notice of Allowance for U.S. Appl. No. 11/138,004, mailed Apr. 8, 2010.
Office Action for U.S. Appl. No. 11/138,004, mailed Nov. 6, 2009.
Office Action for U.S. Appl. No. 11/138,004, mailed May 5, 2009.
Office Action for U.S. Appl. No. 11/138,004, mailed Jun. 9, 2008.
Notice of Allowance for U.S. Appl. No. 11/138,004 mailed Jul. 23, 2010.

* cited by examiner

ONLINE PURCHASE OF DIGITAL MEDIA BUNDLES HAVING INTERACTIVE CONTENT

CROSS-REFERENCE TO RELATED APPLICATIONS

This application is a continuation-in-part of U.S. patent application Ser. No. 11/138,004, filed May 25, 2005, and entitled "ONLINE PURCHASE OF DIGITAL MEDIA BUNDLES", which is hereby incorporated herein by reference, which claims priority of U.S. Provisional Patent Application No. 60/622,280, filed Oct. 25, 2004, and entitled "ONLINE PURCHASE OF DIGITAL MEDIA BUNDLES", which is hereby incorporated herein by reference.

This application claims priority of U.S. Provisional Patent application No. 60/622,280, filed Oct. 25, 2004, and entitled "ONLINE PURCHASE OF DIGITAL MEDIA BUNDLES", which is hereby incorporated herein by reference.

In addition, this application is related to (i) U.S. patent application Ser. No. 10/832,812, filed Apr. 26, 2004, and entitled "METHOD AND SYSTEM FOR SECURE NETWORK-BASED DISTRIBUTION OF CONTENT", (ii) U.S. patent application Ser. No. 10/833,267, filed Apr. 26, 2004, and entitled "METHOD AND SYSTEM FOR NETWORK-BASED PURCHASE AND DISTRIBUTION OF MEDIA", (iii) U.S. patent application Ser. No. 10/832,984, filed Apr. 26, 2004, and entitled "GRAPHICAL USER INTERFACE FOR BROWSING, SEARCHING AND PRESENTING MEDIA ITEMS", (iv) U.S. Provisional Patent application No. 60/622,178, filed Oct. 25, 2004, and entitled "RESERVATION OF DIGITAL MEDIA ITEMS", and (v) U.S. Provisional Patent Application No. 60/620,223, filed Oct. 18, 2004, and entitled "NETWORK-BASED PURCHASE AND DISTRIBUTION OF DIGITAL MEDIA ITEMS", all of which are hereby incorporated herein by reference herein.

BACKGROUND OF THE INVENTION

1. Field of the Invention

The present invention relates to the purchasing of digital media assets and, more specifically, to the purchase of media asset bundles.

2. Description of the Related Art

Traditionally, music has been purchased at music stores or music departments of larger stores. A consumer will visit the music store or department and manually browse for albums or compact discs (CDs) of interest. After the consumer selects an album or CD of interest, the consumer proceeds to a checkout register to pay for the album or CD being purchased.

In recent years music delivery or distribution over the Internet has become popular. Due to the advances in efficient file formats, such as MP3 and MPEG4, the size of media files has become small enough to make their download via the Internet practical. Also, technological advances have led to higher-speed Internet connections and lower cost of memory. The combination of these advances make downloading media files, such as for music and videos, manageable and not too time consuming.

One popular approach to online music distribution is Apple's® iTunes® online music store. Consumers may use the iTunes® online music store to purchase music either as individual music tracks or in albums of songs. Other music stores such as Rhapsody™ and Napster™ have also been employed to purchase music online.

However, one limitation common to online music stores is in the limited options a consumer has when purchasing music albums. Currently, a music album available from an online media store contains a group of music files and no other file types. However, there are cases when a distributor of a music album may want to distribute other media file types along with the music files. It is therefore desirable to enable the online distribution of media bundles that contain disparate media file types.

SUMMARY OF THE INVENTION

The invention pertains to techniques for purchasing media asset bundles. These techniques can allow a user of a client computer to identify, preview, and purchase media asset bundles. In the context of this application, a media asset bundle is a group of media assets, where at least one of the media assets is an interactive media asset.

The invention can be implemented in numerous ways, including as a method, system, device, apparatus, graphical user interface, or computer readable medium. Several embodiments of the invention are discussed below.

As a method for obtaining a media asset bundle, one embodiment of the invention includes at least the acts of: browsing for a media asset bundle, wherein the media asset bundle comprises a plurality of media assets and wherein at least one of the media assets in the media asset bundle is an interactive media asset; purchasing the media asset bundle; and obtaining the media assets contained in the media asset bundle.

As a method for obtaining a media asset bundle, another embodiment of the invention includes at least the acts of: receiving a client request to purchase a media asset bundle, wherein the media asset bundle comprises a plurality of media assets and wherein at least one of the media assets in the media asset bundle is an interactive playable media asset; authorizing a payment for the request to purchase the media asset bundle; obtaining the media assets of the media asset bundle; and making the media asset bundle available to the requesting client.

As a method for presenting a media asset bundle, wherein the media asset bundle comprises at least one interactive playable media asset and at least one non-interactive playable media asset, one embodiment of the invention includes at least acts of: receiving a selection of a media asset in the media asset bundle; determining whether the media asset in the media asset bundle is interactive or non-interactive; if the media asset is determined to be interactive, playing the media asset and receiving a user interaction with the media asset being played; and else, if the media asset is determined to be non-interactive, playing the media asset without any user interaction.

As a method for obtaining a media asset bundle, one embodiment of the invention includes at least the acts of: receiving a client request to purchase a media asset bundle, wherein the media asset bundle comprises a plurality of media assets, including at least one playable file comprising music and at least one interactive multimedia; authorizing a payment for the request to purchase the media asset bundle; obtaining the media assets of the media asset bundle; making the media asset bundle available to the requesting client; selecting a media asset in the media asset bundle; determining whether the media asset in the media asset bundle is interactive or non-interactive; if the media asset is determined to be interactive, playing the media asset and receiving a user interaction with the media asset being played; and else, if the media asset is determined to be non-interactive, playing the media asset without any user interaction.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Figure 1:
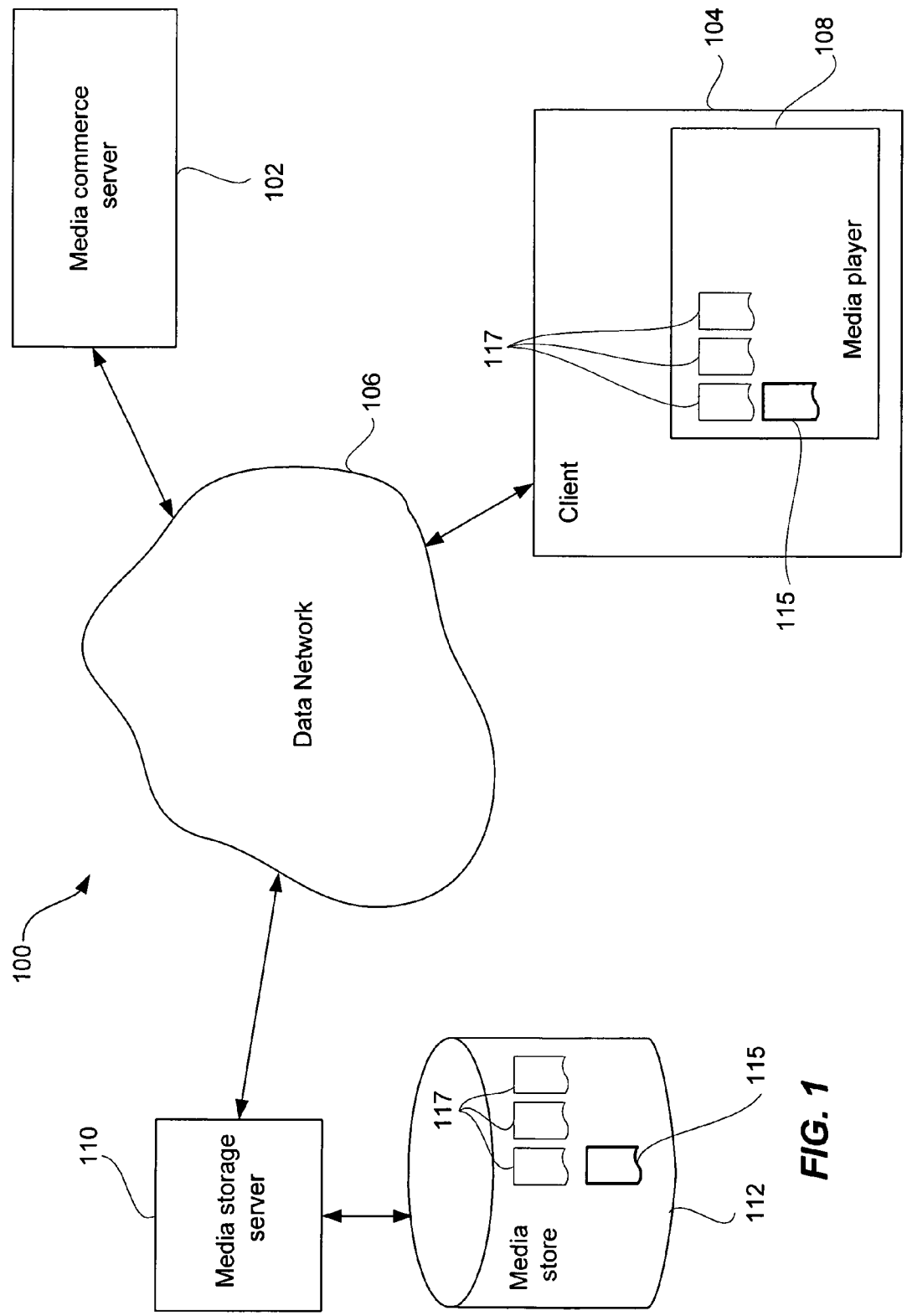
FIG. 1 is a block diagram of a multi-device media purchase system according to one embodiment of the invention.

The invention pertains to techniques for purchasing media asset bundles. These techniques can allow a user of a client computer to identify, preview, and purchase media asset bundles. In the context of this application, a media asset bundle is a group of media assets, where at least one of the media assets is an interactive media asset.

Media assets are digital media items, for example audio, video, text, graphics, or multimedia files. The term media asset includes, but is not limited to, a wide variety of digital media items of various types, including songs or other audio files (e.g., MP3, MPEG4, AAC, WMA), music videos (e.g., QuickTime®, AVI), e-books, graphics (e.g., bitmap, JPEG, TIFF), portable document files (PDFs), digital slide presentations (e.g., Microsoft® PowerPoint® presentations), or interactive multimedia presentations (e.g., presented using a multimedia application such as QuickTime® or Macromedia Flash®).

Media assets can be classified into two other sub-types: playable media assets and non-playable media assets. Playable media assets include audio, video and multimedia files, i.e., files that are typically presented or "played" in media players. Examples of playable media assets include, but are not limited to, music, music videos, audio books, promotional films, concert footage, artist interviews, motion pictures and interactive multimedia presentations.

Further, playable media assets can be classified as interactive or non-interactive. Interactive playable media assets enable a user to interact with the playing of the interactive playable media assets. Non-interactive playable media assets do not enable a user to interact with its playing. One example of an interactive playable media asset is an interactive multimedia presentation (e.g., presented using a multimedia application such as QuickTime® or Macromedia Flash®). Typically, the interactive playable media asset includes executable or interpretive codes, commands or instructions that facilitate the interactivity with a user. Examples of non-interactive playable media assets usually include audio files, music videos, e-books, graphics (e.g., bitmap, JPEG, TIFF), portable document files (PDFs), and digital slide presentations.

Non-playable media assets include text and graphic files that are typically presented or "viewed" in browser or viewer applications (e.g., non-playable media asset viewers). As an example, a non-playable media asset could be a PDF file, viewed with a non-playable media asset viewer, in this case Adobe® Acrobat® Reader, which is typically used to view PDF files. Both playable and non-playable media assets may be protected by digital rights management DRM protection (e.g., Apple's® Fair Play DRM) to limit access to the media assets to the purchaser of those media assets (see, for example, U.S. application Ser. No. 10/832,812.) Examples of non-playable media assets include photographs, logos, drawings, pamphlets, and e-books.

One example of a media asset bundle is a digital boxset. The digital boxset is a collection of songs available for purchase from an online media store. A digital boxset can be considered an online analogue of box sets traditionally sold in record stores. Traditionally, box sets contain several albums by a single recording artist, often along with bonus songs and liner notes describing the music contained in the box set. According to one embodiment, a digital boxset might include a variety of media assets including several songs, possibly one or more music videos, and possibly a text, graphic or PDF file containing liner notes. The digital boxset might also include an interactive multimedia content. The interactive multimedia content, when played, yields an interactive multimedia presentation. In one implementation, the interactive multimedia presentation is an interactive booklet. The interactive multimedia presentation can include text, graphics, video, animation, etc. The presentation can enable a user to interact with the multimedia presentation so as to influence the multimedia presentation. For example, a user (e.g., through navigation or selection inputs) might cause the multimedia presentation to (i) present certain information or media (e.g., liner notes, lyrics, music video, etc.), or (ii) provide a computer-implemented game or animation. In one embodiment, the user can further interact with the computer-implemented game or animation being presented to influence the game or animation. In one embodiment, the interactive multimedia presentation can be presented using a multimedia application such as a HTML browser, QuickTime® or Macromedia Flash®.

Typically, a consumer wishing to buy a media asset bundle online will employ a media management application or media player running on a client computer to make the purchase. Media management applications (MMAs) or media players, in the context of this invention, include software applications that typically incorporate the ability to do one or more of the following: play, browse, organize, purchase, and/or transfer digital media items between devices, including to portable media players (e.g., MP3 or AAC players). An example of a media management application is Apple's® iTunes® application, produced by and available from Apple, Inc., of Cupertino, Calif. An example of a portable media player is Apple's® iPod® available from Apple®, Inc.

Embodiments of the invention are discussed below with reference to FIGS. 1-9. However, those skilled in the art will readily appreciate that the detailed description given herein with respect to these figures is for explanatory purposes as the invention extends beyond these limited embodiments.

FIG. 1 is a block diagram of a multi-device media purchase system 100 according to one embodiment of the invention. The media purchase system 100 includes a media commerce server 102. The media commerce server 102 coordinates review and/or purchase of media assets (e.g., digital media items) through on-line transactions. Media assets are categorized as playable media assets 117 and non-playable media assets 115. Moreover, the playable media assets 117 can be further categorized as interactive or non-interactive media assets. On-line transactions to purchase media assets are also referred to as electronic commerce (e-commerce). The media purchase system 100 also includes a client 104. Typically, the media purchase system 100 would include a plurality of different clients 104. Each client 104 includes a media player or media management application 108 (hereafter media player 108). The media player 108 is an application program (e.g., software application) that operates on the client 104, which is a computing device. The client 104 is coupled to the media commerce server 102 through a data network 106. Hence, any of the clients 104 can interact with the media commerce server 102 to review and/or purchase media assets. In one embodiment, the data network 106 includes at least a portion of the Internet. The clients 104 can vary with application but generally are computing devices that have memory storage. Often, the clients 104 are personal computers or other computing devices that are capable of storing and presenting media to their users.

The media purchase system 100 also includes a media storage server 110 and a media store 112. The media storage server 110 represents a remote storage server that couples to the data network 106. The media store 112 provides mass storage of the numerous playable media assets 117 and non-playable media assets 115 that are available for purchase via the media purchase system 100. Once purchased, the media assets can be accessed from the media store 112 over the data network 106 by way of the media storage server 110.

More particularly, the media purchase system 100 allows a user of the client 104 to utilize the media player 108 to browse, search or sort through a plurality of media asset bundles (not shown) that can be purchased from the media commerce server 102. The media player 108 may also allow the user to preview a media clip of the media asset. In the event that the user of the media player 108 desires to purchase a particular media asset bundle (e.g., a media collection or digital boxset), the user (via the media player 108) and the media commerce server 102 engage in an on-line commerce transaction in which the user pays for access rights to the media assets in the media asset collection.

In the media purchase system 100 shown in FIG. 1, the media assets are stored in the media store 112 and retrieved via the media storage server 110. Hence, the media commerce server 102 need not burden its resources to deliver any of the media assets that may be purchased to the client 104. Instead, on purchasing a particular media asset bundle, the media commerce server 102 sends download information to the media player 108 on the client 104. The download information can then be used by the media player 108 (and the client 104) to retrieve the media content for the particular media asset bundle by interacting with the media storage server 110 through the data network 106. In this regard, the media storage server 110 obtains media assets from the media store 112 and downloads such media assets through the data network 106 to the client 104. The downloaded media assets can then be stored on the client 104. Thereafter, the media player 108 can present (e.g., play or view) the media assets at the client 104.

The connections through the data network 106 between the media commerce server 102, the client 104 and the media storage server 110 can be through secure connections, such as Secure Sockets Layer (SSL). Further, the media assets are typically stored at the client 104 in an encrypted manner.

Figure 2:
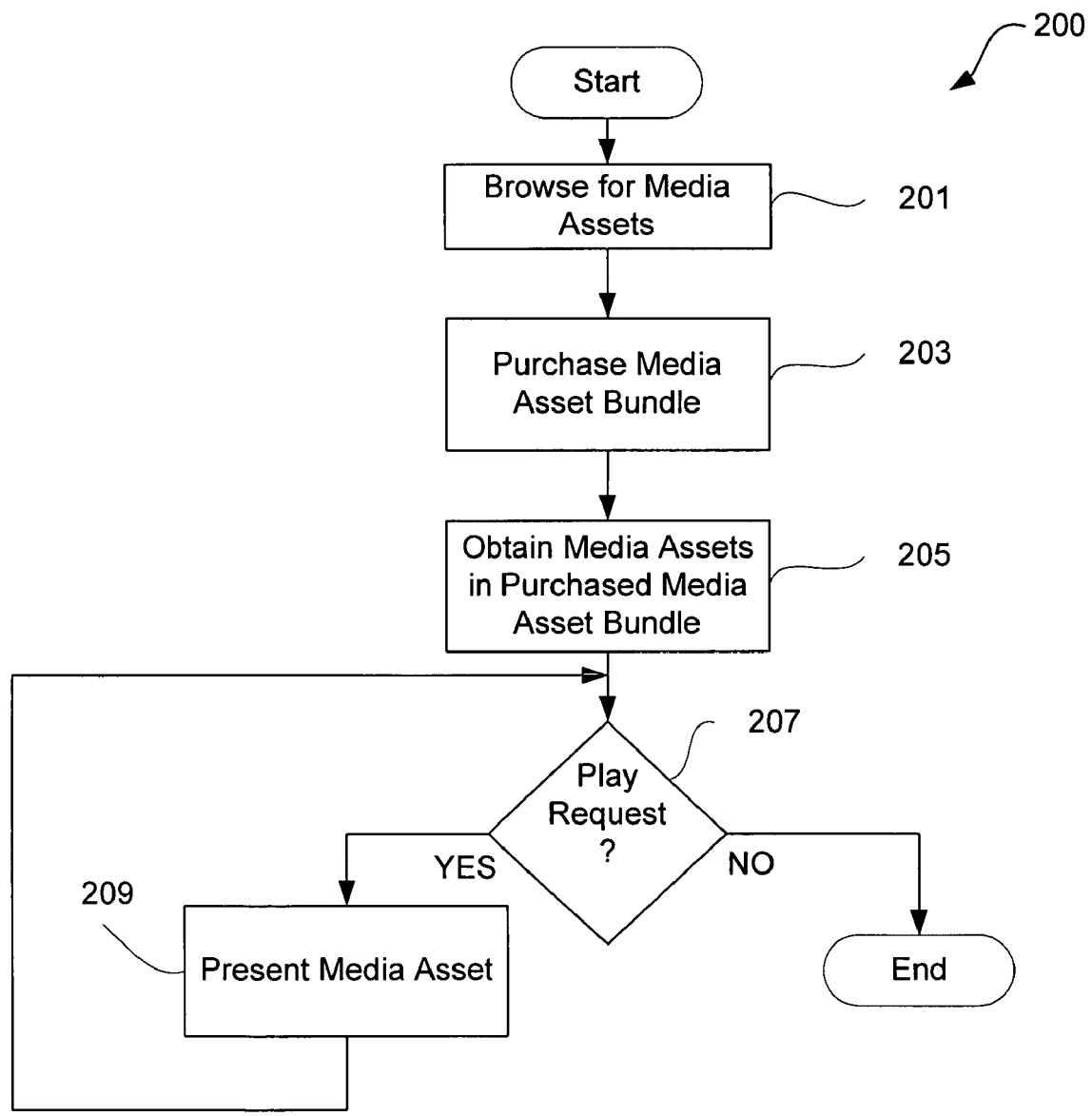
FIG. 2 is a flow diagram of a media asset bundle purchase and presentation process according to one embodiment of the invention.

FIG. 2 is a flow diagram of a media asset bundle purchase and play process 200 according to one embodiment of the invention. The media asset bundle purchase and present process 200 is, for example, associated with a media player of an online media purchase system. The media player can, for example, be the media player 108 operating on the client 104 illustrated in FIG. 1. The media asset bundle purchase and present process 200 typically permits a user to browse 201 available media assets. Typically, as noted above, media assets include audio, video, text, graphics and multimedia files. Some media assets will be grouped into media asset bundles, which can be purchased in a single transaction. In one embodiment, any or all of the media assets in a media asset bundle may also be purchased separately. Generally, a user will see some advantage in purchasing a media asset bundle over buying media assets individually, including: a discounted price per media asset when bought as part of the bundle, or the inclusion of media assets that are unavailable except as part of a media asset bundle. For example, the media asset bundle might include non-playable media items such as liner notes that are unavailable except as part of a media asset bundle. As another example, the media asset bundle might include playable media items such as an interactive multimedia presentation that is unavailable except as part of a media asset bundle.

After the user browses 201 the available media assets and media asset bundles, the user purchases 203 a media asset bundle of interest. Upon the completion of the purchase 203, the media assets of the media asset bundle are obtained 205 (e.g., by download or e-mail attachment). In one embodiment, as disclosed in related U.S. patent application Ser. No. 10/833,267, a client may receive a media access response containing instructions to the media player (or other client application) enabling the retrieval of each media asset in the media asset bundle that was purchased. Once media assets are obtained 205, a decision 207 determines if a presentation request for a media asset has been made (e.g., by a user selecting the media asset in the media player.) If the presentation request has been made, the media asset is presented 209 (e.g., played or viewed) to the user. The manner in which the media asset is presented 209 is dependent on the type of media asset.

Figure 3:
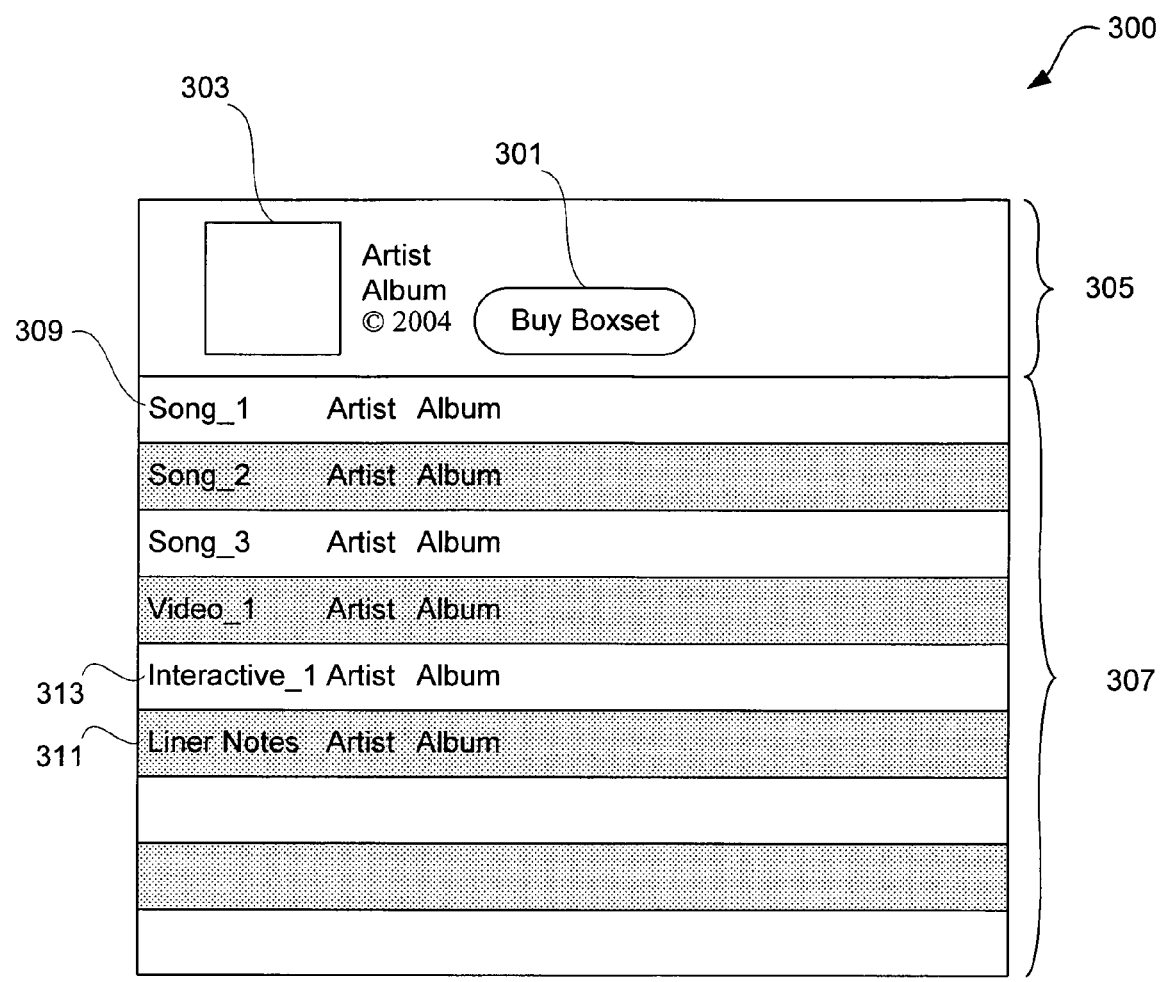
FIG. 3 is an exemplary application window showing an interface for browsing and purchasing of a media asset bundle according to one embodiment of the invention.

FIG. 3 is an exemplary application window 300 showing an interface for browsing and purchasing of a media asset bundle according to one embodiment of the invention. In one embodiment of the invention, the application window 300 is produced by a media management application.

The application window 300 includes a media asset display panel 305, which typically contains information and graphics relating to a particular media asset bundle (or group of media assets) that is referred to as a "digital boxset." Additionally, the application window 300 contains a media asset listing 307, having detailed information regarding individual media assets in the media asset bundle. Typically, this detailed information includes such things as publisher information and media asset title. The media asset listing 307 shows media asset information for songs, videos, interactive multimedia files, and liner notes associated with the particular media asset bundle (e.g., digital boxset). In this example, the media asset information includes title, artist name, and album name. Of course other information could be displayed as well, such as year published, playing time, music genre, etc.

The media asset listing 307 contains a list of media assets, including both playable media assets 309 and non-playable media assets 311. In this embodiment, playable media assets 309 include songs and videos, while a non-playable media asset 311 shown is a liner notes file, which typically contains text and/or graphics. Further, one of the playable media assets 309 is an interactive media asset 313. The media asset display panel 305 contains artist and album information as well as a graphic 303, for example an album cover graphic, associated with the media asset bundle. Additionally, the media asset display panel 305 includes a purchase button 301 (labeled "Buy Boxset", in this embodiment), which enables the user to purchase the media assets listed in the media asset listing 307.

Figure 4A:
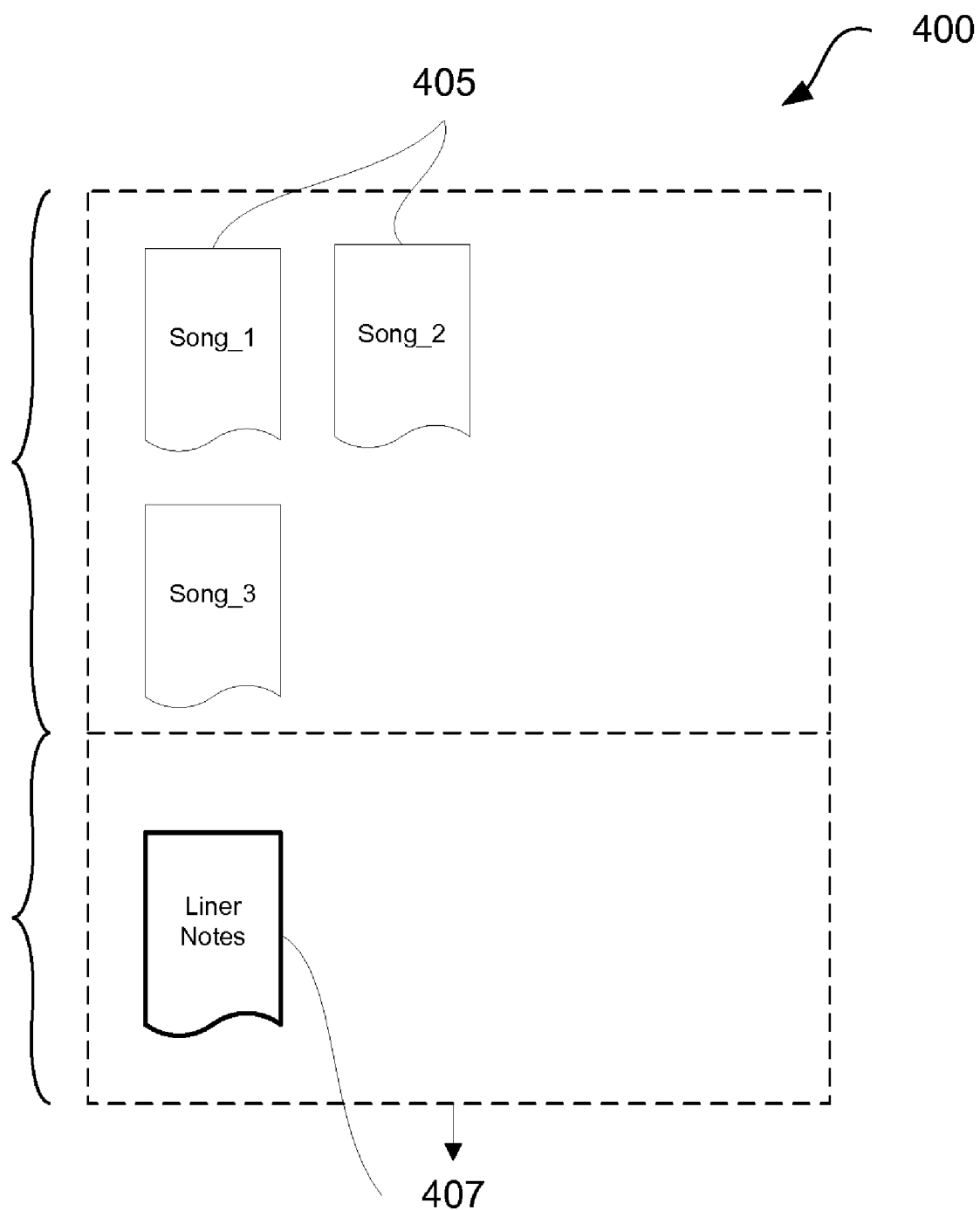
FIG. 4A is a block diagram of a media asset bundle according to one embodiment of the invention.

FIG. 4A is a block diagram of an exemplary media asset bundle 400 according to one embodiment of the invention. The media asset bundle 400 includes a plurality of playable media assets 401 and at least one non-playable media asset 403. Specifically, in this exemplary media asset bundle 400 the playable media assets 401 are songs 405 (e.g., digital music files) and the non-playable media asset 403 is liner notes 407 (e.g., a document containing text and/or graphics).

In another embodiment of the invention, the media asset bundle can include a plurality of playable and/or non-playable media assets. As noted above, media assets include, but are not limited to audio files, video files, graphics and multimedia files. The playable media assets, namely, the multimedia files, can be interactive or non-interactive.

Figure 4B:
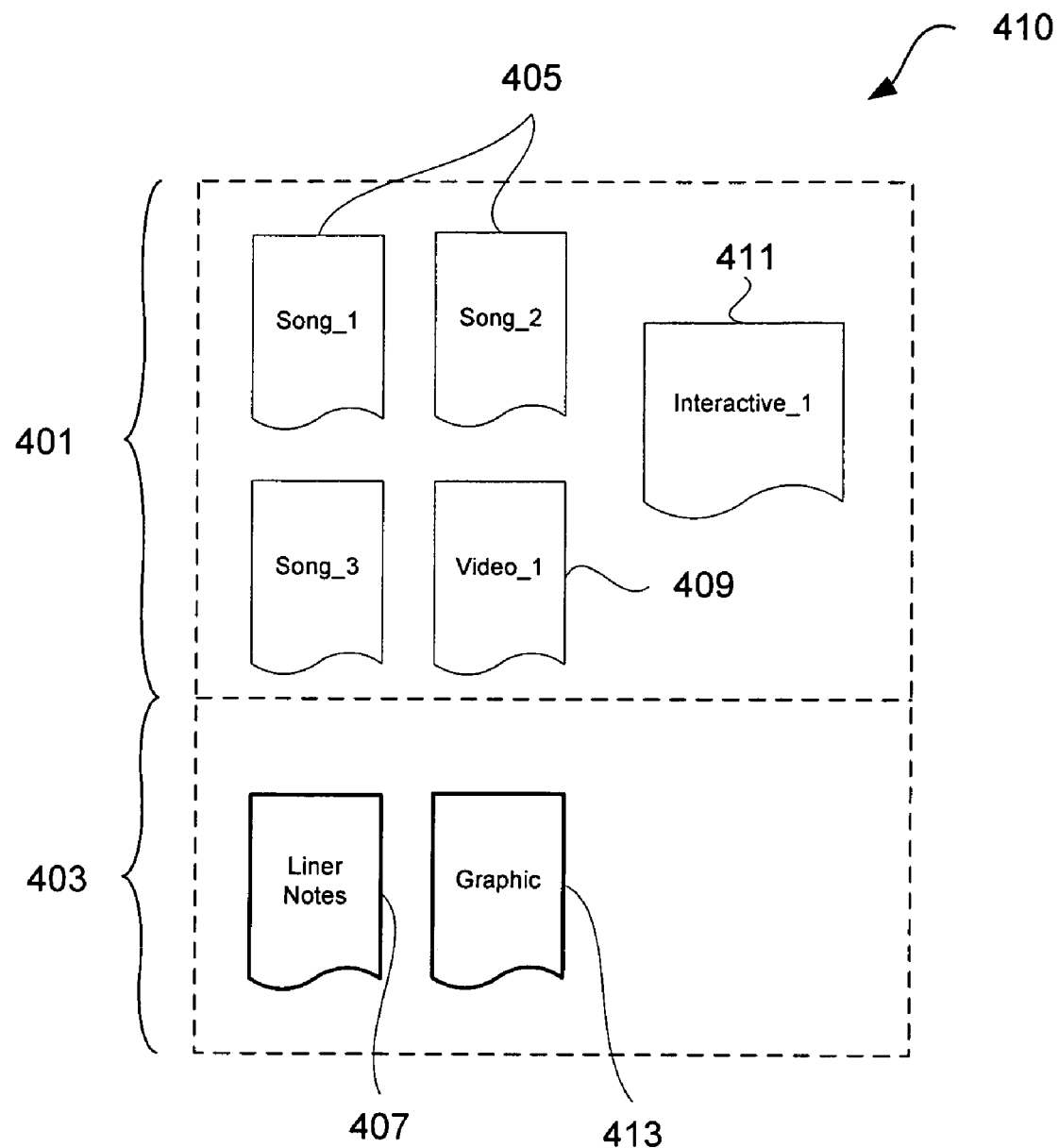
FIG. 4B is a block diagram of a media asset bundle according to another embodiment of the invention.

FIG. 4B is a block diagram of an exemplary media asset bundle 410 according to another embodiment of the invention. As in FIG. 4A, this embodiment contains playable media assets 401 and non-playable media assets 403. In this embodiment, the media asset bundle 410 further contains a non-interactive playable media asset 409, namely, a video file (e.g., a music video) and an interactive playable media asset 411, namely, an interactive multimedia file (e.g., an interactive multimedia presentation). The media asset bundle 410 further contains an additional non-playable media asset, namely, a digital graphic 413 (e.g., a photograph or logo). Although the media asset bundle 410 in FIG. 4B includes non-playable media assets 403, in another embodiment, a media asset bundle could just include the playable media assets 401.

Figure 5:
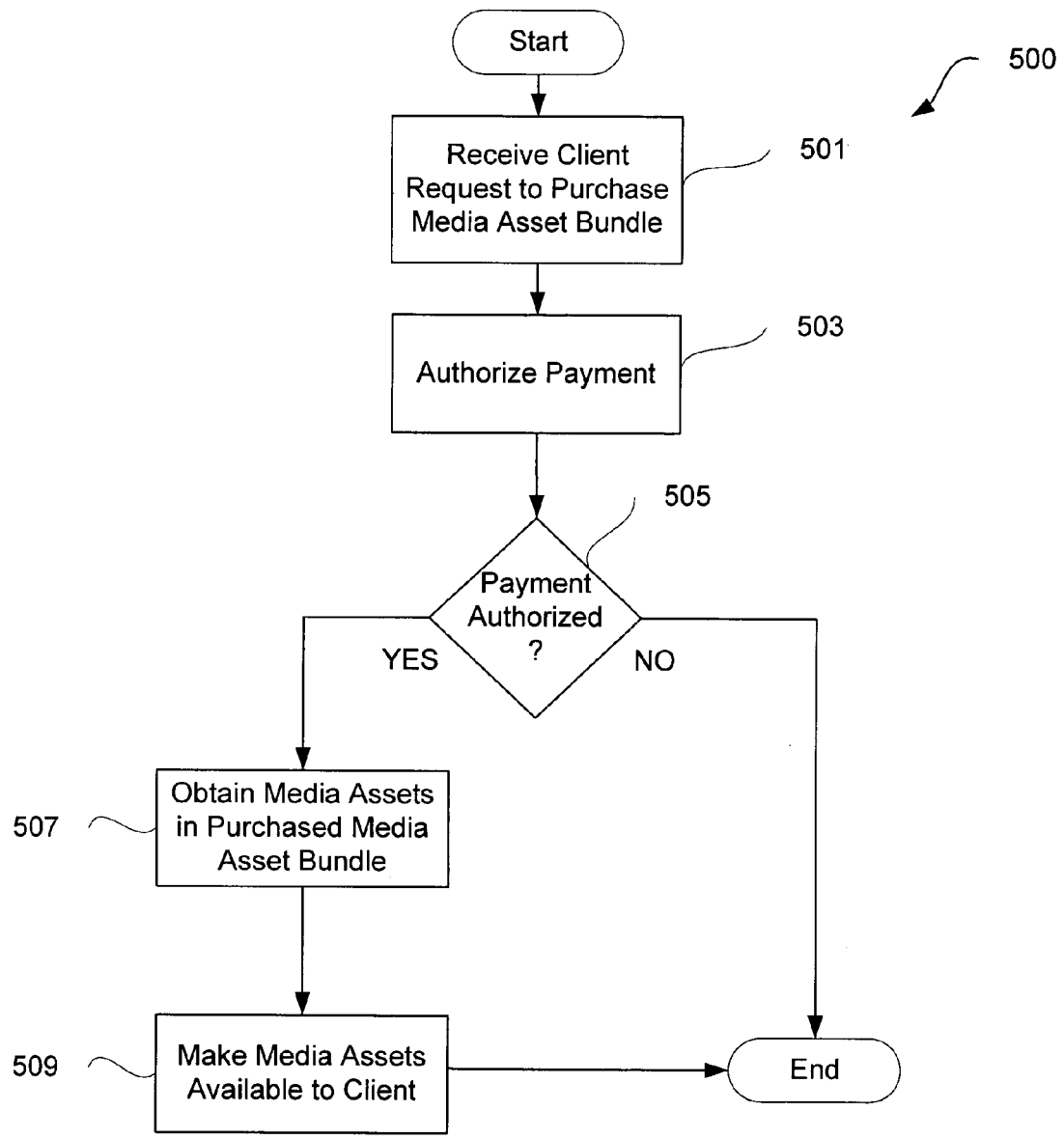
FIG. 5 is a flow diagram of a server-side media asset bundle purchase process according to one embodiment of the invention.

FIG. 5 is a flow diagram of a server-side media asset bundle purchase process 500 according to one embodiment of the invention. This process is, for example, associated with one or more server computers of a media purchase system. The server computers can, for example, be the media storage server 110 and/or the media commerce server 102 illustrated in FIG. 1.

The server-side media asset bundle purchase process 500 begins with receiving 501 a client request to purchase a media asset bundle, for example, a digital boxset. Next, a payment is authorized 503. Authorization may proceed according to conventional online payment methods or as described in related U.S. patent application Ser. Nos. 10/833,267 and 10/832,812. Next, decision 505 determines if payment has been authorized. If payment has not been authorized, the purchase is denied and media asset bundle purchase process 500 ends. On the other hand, if decision 505 determines that payment has been authorized, the media assets in the media asset bundle are obtained 507. For example, the media assets in the media asset bundle can be obtained 507 by looking up media asset locations in a database and gathering the media assets at a server computer. Finally, the media assets are made available 509 to the requesting client. The media assets can be made available 509 by, for example, transmitting the individual media assets to the client, by storing a media interest indicator on a server computer such that a user may download the media assets at a later time, or by sending a media access response (e.g., a document containing download information) to be used by a media management application to download the media assets when practicable (for a discussion of exemplary media access response formats, see related U.S. patent application Ser. No. 10/832,812.)

Figure 6:
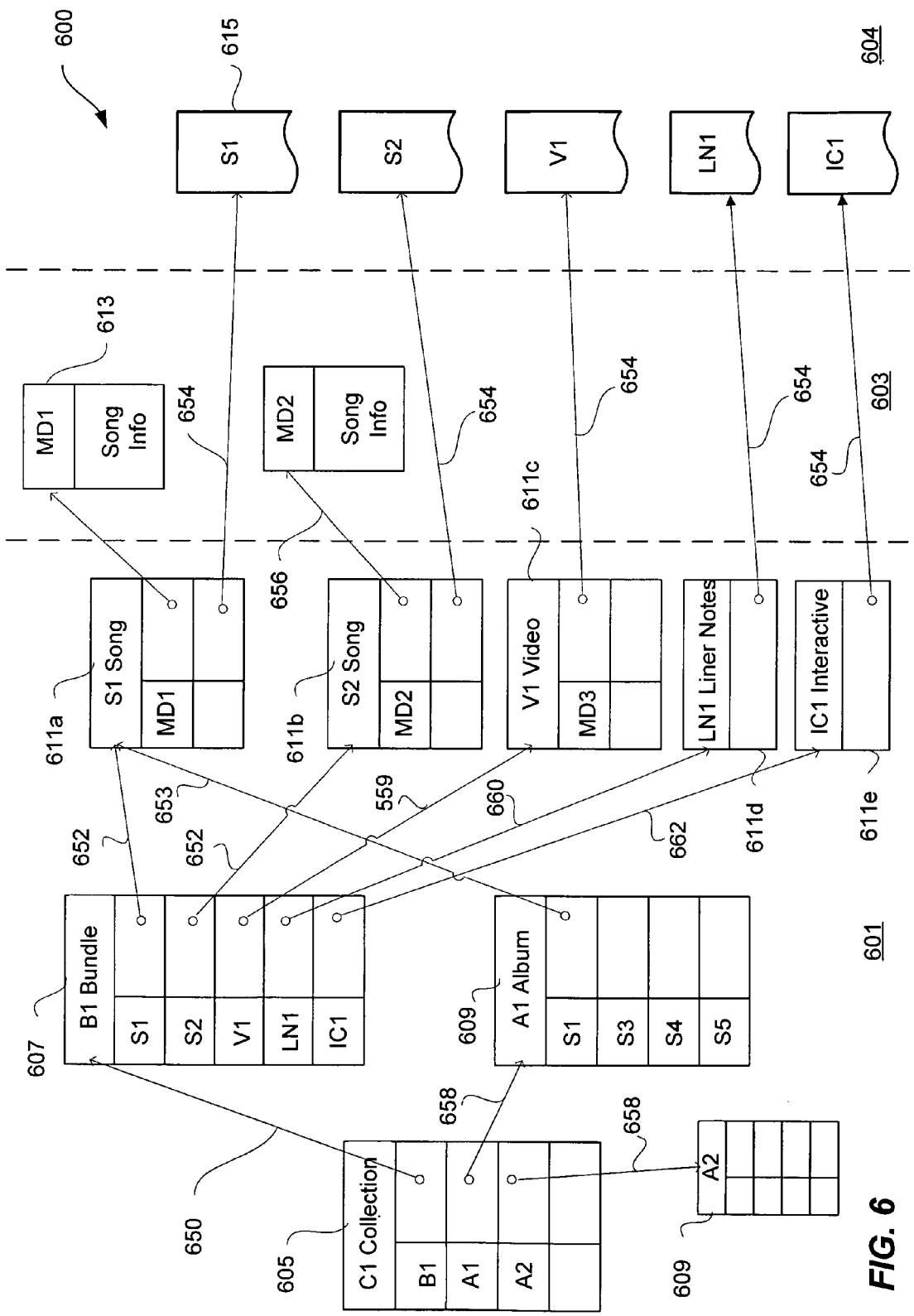
FIG. 6 is a block diagram representation of an exemplary relational database containing various data tables and tables of pointers to digital media assets according to one embodiment of the invention.

FIG. 6 is a block diagram representation of an exemplary relational database 600 containing various data tables and tables of pointers 650 pertaining to digital media assets according to one embodiment of the invention. Other database types (such as flat file databases) may be used as well. The database 600 may be used, for example, at operation 507 of the server-side media asset bundle purchase process 500 discussed above. It should be understood that there are a wide variety of database organizational structures, and that FIG. 6 is meant to be exemplary and not as limiting the invention to any particular database structure.

FIG. 6 shows three exemplary data sections in the database 600, which may be distributed across one or more media or database servers. A database table section 601 contains the database, i.e., the relational data tying the database together. As will be understood by those familiar with database organization, database tables may be implemented as tables of pointers pointing to other tables or to files on a server computer. The database table section 601 shown contains collection tables 605 (e.g., C1), album tables 609 (e.g., A1 and A2), bundle tables 607 (e.g., B1), and media asset tables 611a-611e (e.g., S1, S2, V1, LN1 and IC1).

In addition to the database table section 601, the relational database also includes a metadata section 603. As can be seen in FIG. 6, the metadata section 603 contains metadata information, organized in metadata tables 613 (e.g., MD1 and MD2). Metadata, in the context of this figure, includes information relating to media assets, for example, songs. Typical metadata information includes media asset title, publication information, artist information, etc. The exemplary metadata tables 613 shown in FIG. 6 contain song information such as is normally stored in, for example ID3 tags in typical MP3 files, including such data as song titles, artist names, music genres, song release dates, etc.

The relational database further includes a media asset storage section 604. The media asset storage section 604 is, for example, a file server or a media storage device such as the media store 112 shown in FIG. 1.

As discussed above, the database 600 contains a variety of tables, stored in database table section 601. Typical tables include a collection table 605. The collection table 605 may include pointers 650 to several media asset bundles, including music albums and compilations. In one embodiment, collection table 605 contains pointers 650 to a media asset bundle, logically represented by bundle table 607, which includes pointers 652 that lead to media asset tables 611a-611e, which contain pointers 654 that lead to media assets 615 (e.g., songs S1 and S2, video V1, liner notes LN1, and interactive content IC1) associated with the media asset bundle. The media asset tables 611a-611e can further include pointers 656 to metadata for the associated media assets 615. Alternately; the bundle table 607 may point (not shown) to a plurality of music albums such as the album represented by album table 609. In one embodiment of the invention, the media asset bundle is a digital boxset. Additionally, the collection table 605 shown can contain pointers 658 to the album table 609, which contains pointers to media assets 615 (e.g., songs S1, S2, etc.) in the album.

As illustrated in FIG. 6, the album table 609 and the bundle table 607 include pointers 652 and 653 to songs, some of which are included in both the album table 609 and the bundle table 607. Specifically, for song S1, a media asset 615, is shown as having pointers 653 and 652 to it from both the album table (A1) 609 and the bundle table (B1) 607, respectively. In this case, following the pointers 653 and 652 that lead to the media asset table (S1) 611a leads to a location (e.g., path) of song S1, which is shown as the single media asset 615 that is stored in the media asset storage section 604. The bundle table 607 also includes pointers 559, 660 and 662 to the media asset table (V1) 611c, the media asset table (LN1) 611d and the media asset table (IC1) 611e, respectively.

In FIG. 6, media asset tables 611a-611e contain pointers 654 to media assets 615 (e.g., song files, video files, liner notes, and interactive content) in the media asset storage section 604. The media asset tables shown in FIG. 6 include song tables 611a and 611b, which point to song files S1 and S2 in the media asset storage section 604; a video table 611c, which points to a video file V1 in the media asset storage section 604; a liner notes table 611d, which points to a liner notes file (LN1) in the media asset storage section 604; and an interactive content table 611e, which points to an interactive content file (IC1) in the media asset storage section 604. Other media asset types, such as graphics, multimedia files, audio books, and/or e-books may be stored in the database in a similar manner.

Returning to the media asset bundle table 607 and the album table 609, which may indicate that songs common to both a media asset bundle and an album are stored only once on a single file server, those familiar with the art will understand that media assets associated with a media asset bundle and media assets associated with an album may be stored in different locations, leading to multiple copies of a single media asset across a plurality of file servers. Thus, in one embodiment, song file S1 is stored in one media asset storage section for a first media asset bundle and in a separate media asset storage section for an album.

Figure 7A:
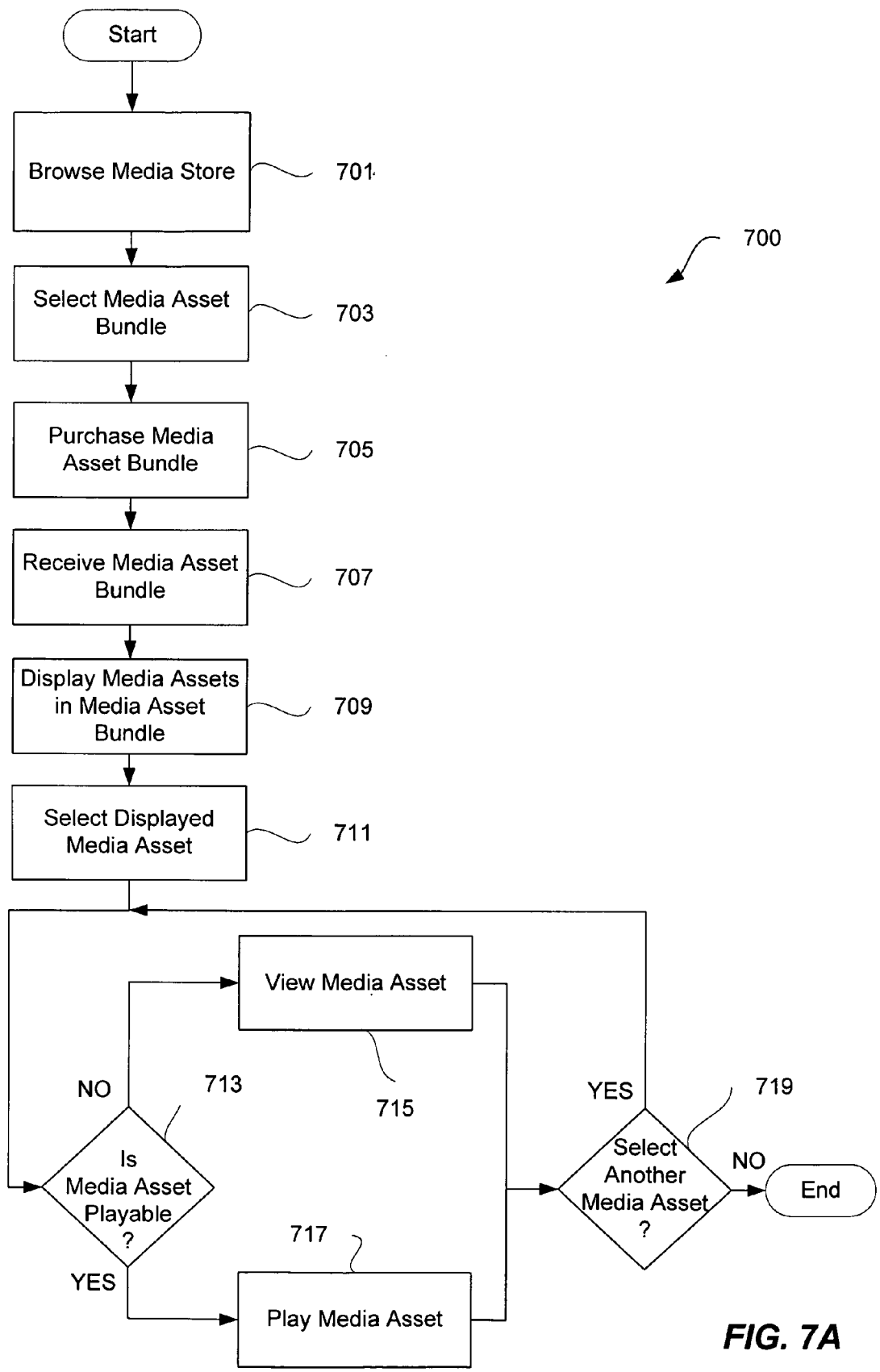
FIG. 7A is a flow diagram of a client-side media asset bundle purchase and presentation process according to one embodiment of the invention.

FIG. 7A is a flow diagram of a client-side media asset bundle purchase and present process 700 according to one embodiment of the invention. The media asset bundle purchase and present process 700 is, for example associated with a client computer of a media purchase system. The client computer can, for example, be the client 104 illustrated in FIG. 1.

The client-side media asset bundle purchase and present process 700 begins with a user browsing 701 a media store, e.g., Apple's® iTunes® Store, using, for example, a media management application e.g., Apple's® iTunes® client application. Next, the user finds and selects 703 a media asset bundle, for example, a digital boxset that he or she wishes to purchase 705. The selection 703 and purchase 705 may be accomplished by selecting, for example, a user interface control, such as a purchase button 301 in the application window 300 shown in FIG. 3. Next, the media asset bundle is received 707 at the client computer, for example, by downloading individual media assets associated with the media asset bundle.

Thereafter, the received media assets can be displayed 709 to the user. Next, a displayed media asset is selected 711 by the user or the client computer. Next, a decision 713 determines if the selected media asset is a playable media asset, such as an audio, video or multimedia file. As noted above, playable media assets include video and audio files, i.e., files that are typically "played" in media players or media management applications. Examples of playable media assets include but are not limited to, music, music videos, movies and interactive multimedia presentations. If the media asset is playable, the selected media asset is presented by playing 717 the media asset in a playable media asset reader (e.g., a media management application or media player). If decision 713 determines that the selected media asset is a non-playable media asset (e.g., liner notes contained in a PDF file), then the selected non-playable media asset is viewed 715 in, for example, a non-playable media asset viewer application, such as the Adobe® Acrobat® Reader, which is commonly used to view PDF files. Finally, decision 719 checks to see if the user has selected another media asset. If a media asset has been selected, the client-side media asset bundle purchase and present process 700 returns to block 713 and subsequent blocks. If, on the other hand, no media asset has been selected, then the process 700 ends.

In one embodiment of the invention, the non-playable media asset viewer application is integral (i.e., built-in) to the media management application or media player used to view 715 the received media assets. In another embodiment, the media management application or media player used to view 715 the received media assets can spawn an external application to view non-playable media assets.

Figure 7B:
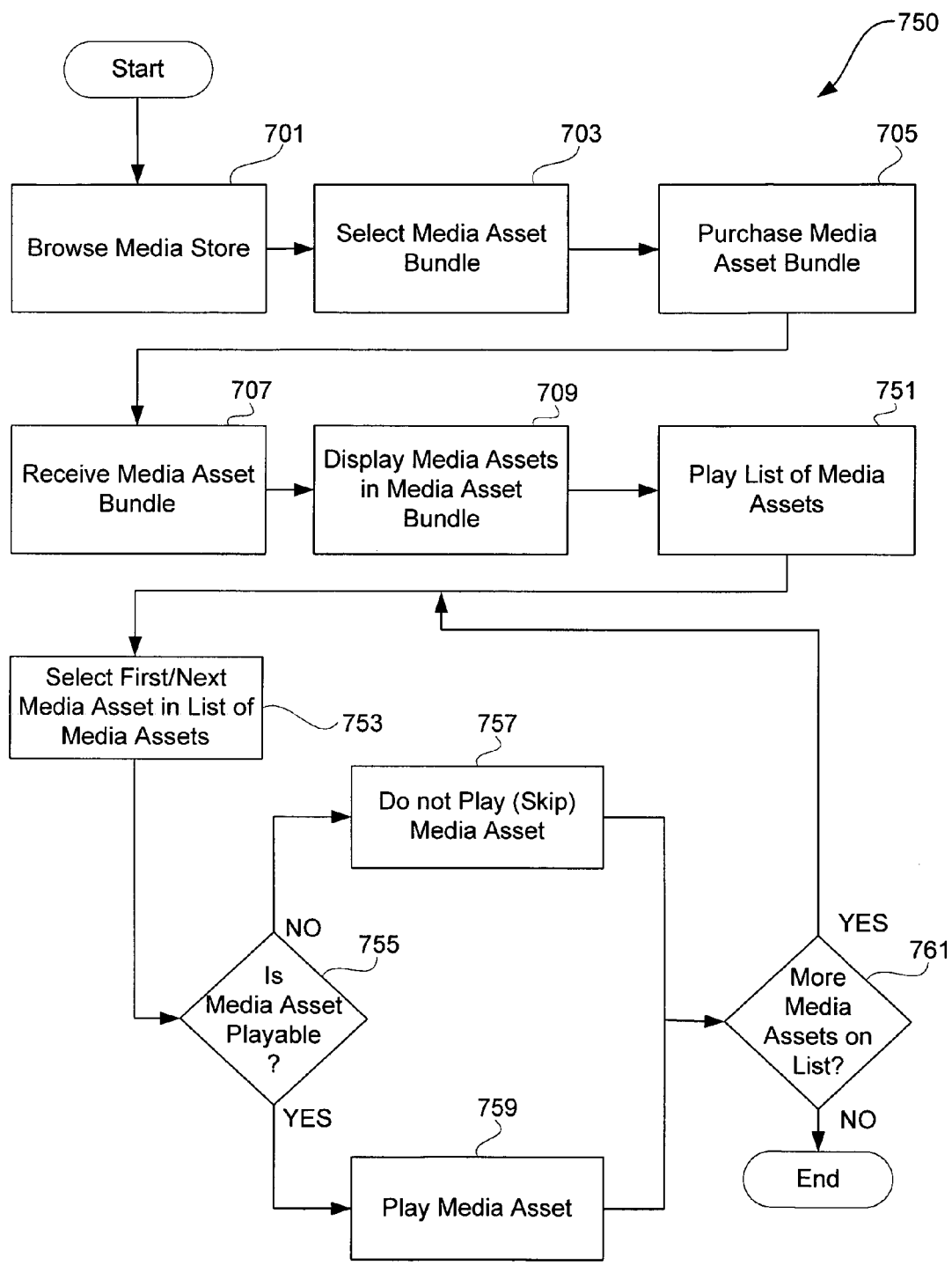
FIG. 7B is a flow diagram of a client-side media asset bundle purchase and present process according to a second embodiment of the invention.

FIG. 7B is a flow diagram of a client-side media asset bundle purchase and present process 750 according to a second embodiment of the invention. According to this embodiment media assets are automatically played sequentially (or randomly) by a media management application or media player (e.g., when the media management application is playing the media assets in a playlist, album, or digital boxset).

Client-side media asset bundle purchase and present process 750 begins with steps 701-709 as described above with reference to FIG. 7B. However, upon the completion of the displaying 709 of media assets in the media asset bundle, the list of media assets is played 751 (e.g., presented by selecting the list and clicking 'play' in the media management application.) Next, the first (or next) media asset in the list of media assets is selected 753, followed by a determination 755 whether the selected media asset is playable. If the selected media asset is playable, then it is played 759 by the media management application or media player. On the other hand, if the selected media asset is not playable then it is skipped 757. Upon completion of the playing 757 of the currently selected media asset, a decision 761 determines if there are more media assets to present in the list of media assets. If there are, the client-side media asset bundle purchase and present process 750 returns to block 753 and subsequent blocks. On the other hand, if decision 761 determines that no more media assets are available (e.g., the media management application has played through the entire media asset bundle), then the process ends. In this way, for example, a media management application may automatically play one or more media assets in a media asset bundle (e.g., boxset) that includes audio files (e.g., songs), video files (e.g., music videos), interactive multimedia files (e.g., interactive multimedia presentation) and text/graphics files (e.g., liner notes) and be able to distinguish between audio, video, interactive multimedia and text/graphics without user intervention. Similarly, a media management application can play one or more media assets in a media asset bundle that includes audio, video and multimedia files as well as text/graphics files by playing only the audio files, only the video files, only the interactive multimedia files, or any combination, depending on the user's preference.

Figure 8:
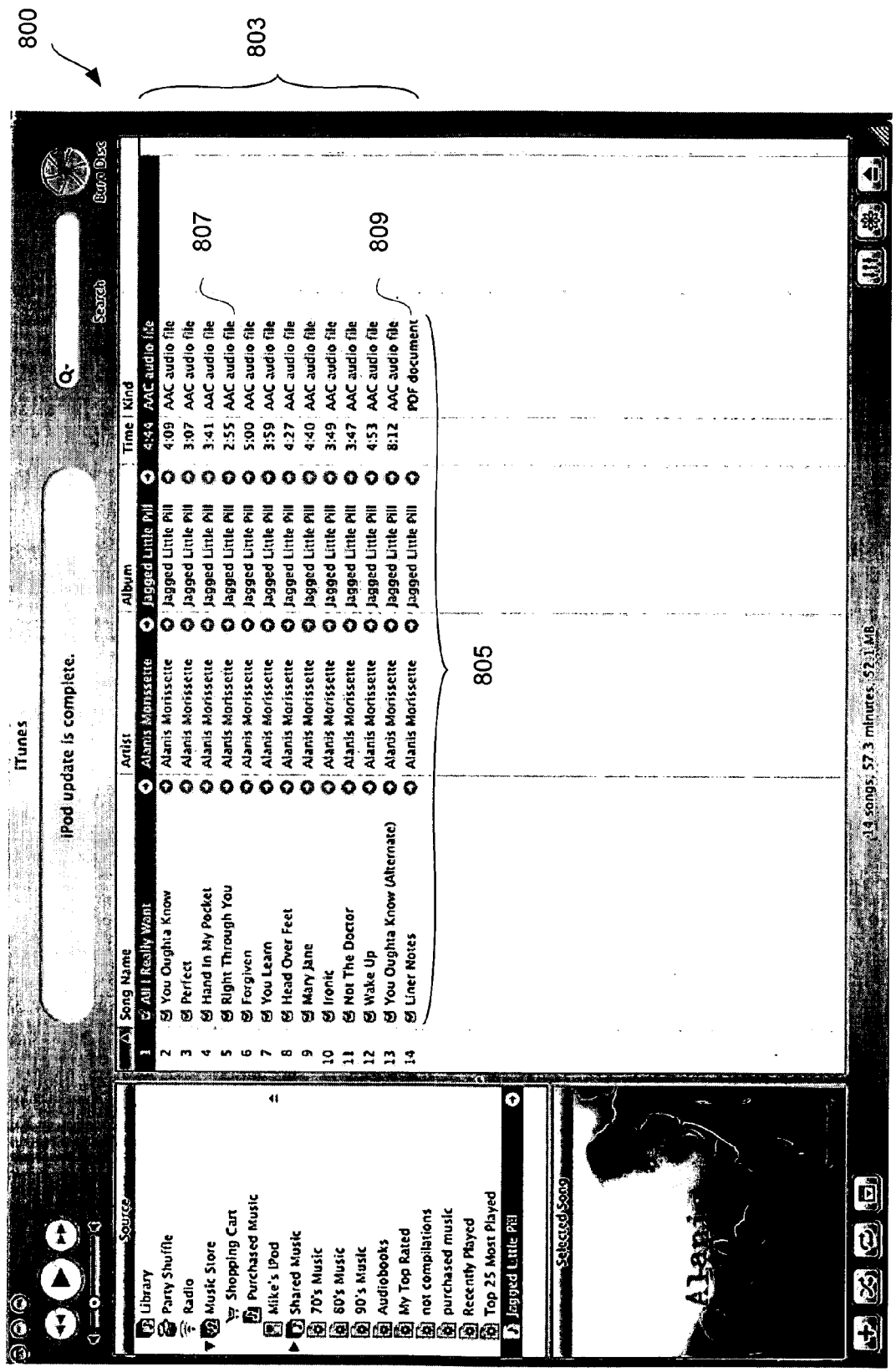
FIG. 8 is a screen shot of a representative application program window according to one embodiment of the invention.

FIG. 8 is a screenshot of a representative application program window 800 according to one embodiment of the invention. This particular screenshot is of a version of iTunes®, a media management application/media player produced by and available from Apple®, Inc. of Cupertino, Calif. The application window contains, among other data, a listing 803 of a plurality of media assets 805, including AAC audio files 807 (songs) and a PDF document 809 (liner notes). As noted above, the PDF document 809 is an example of a non-playable media asset, while the AAC audio files 807 are examples of playable media assets. Although not shown in the application program window 800 shown in FIG. 8, an interactive multimedia file could also be included in the listing 803.

Figure 9:
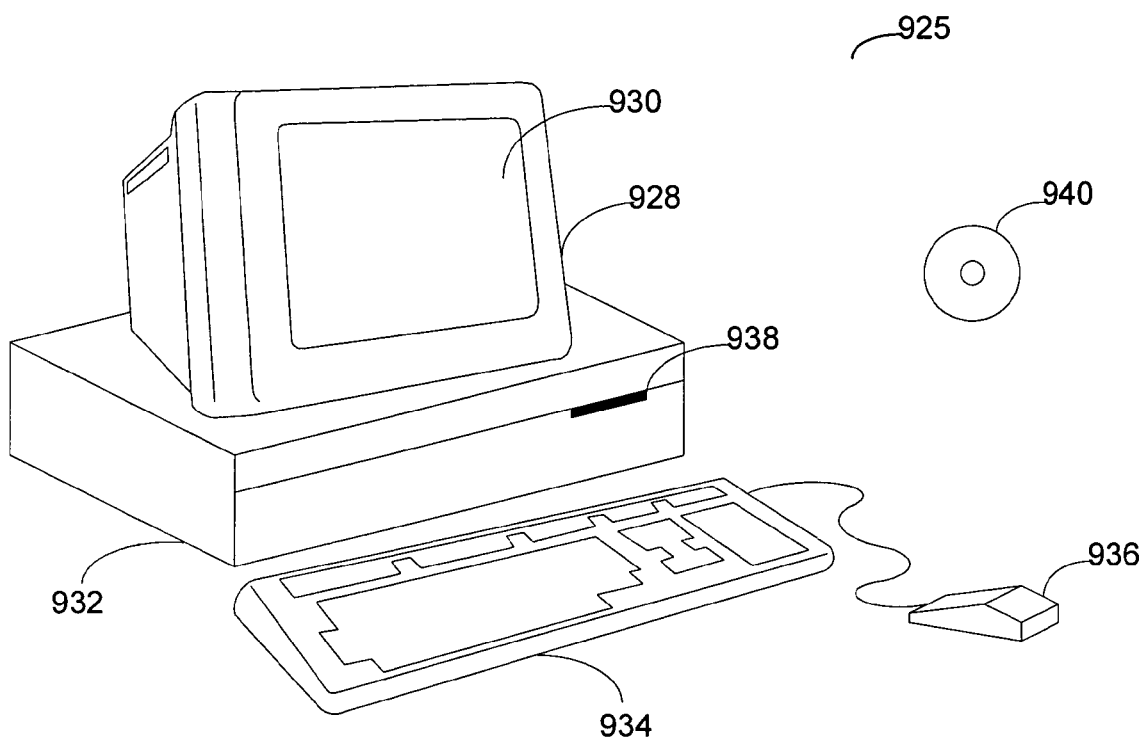
FIG. 9 shows an exemplary computer system suitable for use with the invention.

FIG. 9 shows an exemplary computer system 925 suitable for use as a client according to one embodiment of the invention. The computer system can be, for example, the client 104 as illustrated in FIG. 1. The computer system 925 includes a display monitor 928 having single or multi-screen displays 930 (or multiple displays), cabinet 932, keyboard 934, and mouse 936. Cabinet 932 houses a drive 938, such as a CD-ROM or floppy drive, system memory and a hard drive (not shown) which may be utilized to store and retrieve software programs incorporating computer code that implements the present invention, data for use with the invention, and the like. Although CD-ROM 940 is shown as an exemplary computer readable storage medium, other computer readable storage media including floppy disk, tape, flash memory, system memory, and hard drive may be utilized. In one implementation, an operating system for the computer system 925 is provided in the system memory, the hard drive, the CD-ROM 940 or other computer readable storage medium and serves to incorporate the computer code that implements the invention.

The invention is preferably implemented by software, but can also be implemented in hardware or a combination of hardware and software. The invention can also be embodied as computer readable code on a computer readable medium. The computer readable medium is any data storage device that can store data, which can thereafter be read by a computer system. Examples of the computer readable medium include read-only memory, random-access memory, CD-ROMs, flash memory cards, DVDs, magnetic tape, and optical data storage devices. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for obtaining a media asset bundle, comprising:
    (a) receiving, at a commerce server, a client request from a client device to purchase a media asset bundle, wherein the media asset bundle comprises a plurality of media assets, including at least one playable media file and at least one interactive multimedia asset, wherein the interactive multimedia asset is usable independent of playing the at least one playable media file;
    (b) authorizing a payment for the request to purchase the media asset bundle at the commerce server;
    (c) obtaining the media assets of the media asset bundle from a media storage device;
    (d) making the media asset bundle available to the requesting client device;
    (e) selecting a media asset in the media asset bundle;
    (f) determining whether the media asset in the media asset bundle is interactive or non-interactive;
    (g) if the media asset is determined to be interactive, playing the media asset and receiving a user interaction with the media asset being played;
    (h) else, if the media asset is determined to be non-interactive, playing the media asset without any user interaction;
    (i) determining whether the media asset in the media asset bundle is a non-playable file; and
    (j) if the media asset is determined to be a non-playable file, viewing the non-playable file, wherein the non-playable file is viewable after purchase of the media asset bundle.

2. The method of claim 1, wherein the at least one non-playable file is a liner note.

3. The method of claim 2, wherein the viewing of the non-playable file in a non-playable media asset viewer.

4. The method of claim 2, wherein the non-playable file is selected from the group consisting of a portable document format (PDF) file, a graphics file, a multi-media file and a text file.

5. The method of claim 2, further comprising presenting the non-playable file using a media management application.

6. The method of claim 1, wherein the interactive media asset is an interactive multimedia presentation.

7. The method of claim 1, further comprising presenting the interactive multimedia presentation using a multimedia application.

8. The method of claim 7, wherein the multimedia application is a video application.

9. The method of claim 7, wherein the multimedia application is incorporated into a media management application.

10. The method of claim 7, wherein the multimedia application is spawned by a media management application.

11. The method of claim 1, wherein the making (d) the media asset bundle available further comprises sending the media assets of the media asset bundle to the requesting client.

12. The method of claim 11, wherein the sending is accomplished using a media management application.

13. The method of claim 1, wherein the at least one playable media file comprises audio files, video files or multimedia files.

14. The method of claim 1, wherein the at least one playable media file comprises songs, music videos, audio books, or interactive multimedia presentations.

15. A computer readable storage medium including at least executable computer program code readable by a machine and tangibly stored therein for obtaining a media asset bundle, said computer readable medium comprising:
    computer program code for receiving a client request to purchase a media asset bundle, wherein the media asset bundle comprises a plurality of media assets, including at least one interactive multimedia asset and at least one playable media file, wherein the interactive multimedia asset is usable independent of playing the at least one playable media file;
    computer program code for authorizing a payment for the request to purchase the media asset bundle;

computer program code for obtaining the media assets of the media asset bundle;

computer program code for making the media asset bundle available to the requesting client;

computer program code for selecting a media asset in the media asset bundle;

computer program code for determining whether the media asset in the media asset bundle is interactive or non-interactive;

computer program code for if the media asset is determined to be interactive, playing the media asset and receiving a user interaction with the media asset being played;

computer program code for, if the media asset is determined to be non-interactive, playing the media asset without any user interaction;

computer program code for determining whether the media asset in the media asset bundle is a non-playable file; and computer program code for if the media asset is determined to be a non-playable file, viewing the non-playable file, wherein the non-playable file is viewable after purchase of the media asset bundle.

16. The computer readable storage medium of claim 15, wherein the non-playable file is a liner note.

17. The computer readable storage medium of claim 16, wherein the non-playable file is viewed using a non-playable media asset viewer.

18. The computer readable storage medium of claim 16, wherein the non-playable file is a portable document format (PDF) file.

19. The computer readable storage medium of claim 16, wherein the non-playable file is a graphics file.

20. The computer readable storage medium of claim 16, wherein the non-playable file is a text file.

21. The computer readable storage medium of claim 16, further comprising: presenting the non-playable file using a media management application.

22. The computer readable storage medium of claim 15, wherein the interactive media asset is an interactive multimedia presentation.

23. The computer readable storage medium of claim 22, further comprising:

computer program code for presenting the interactive multimedia presentation using a multimedia application.

24. The computer readable storage medium of claim 23, wherein the multimedia application is a video application.

25. The computer readable storage medium of claim 23, wherein the multimedia application is incorporated into a media management application.

26. The computer readable storage medium of claim 23, wherein the multimedia application is spawned by a media management application.

27. The computer readable storage medium of claim 15, wherein the computer program code for making the media asset bundle available to the requesting client comprises:

computer program code for sending the media assets of the media asset bundle to the requesting client.

28. The computer readable storage medium of claim 25, wherein the sending is accomplished using a media management application.

29. The computer readable storage medium of claim 15, wherein the playable media file comprises audio files, video files or multimedia files.

30. The computer readable storage medium of claim 15, wherein the playable media file comprises songs, music videos, audio books, or interactive multimedia presentations.

\* \* \* \* \*

UNITED STATES PATENT AND TRADEMARK OFFICE
CERTIFICATE OF CORRECTION

PATENT NO.         : 7,844,498 B2                                         Page 1 of 1
APPLICATION NO.    : 11/247974
DATED              : November 30, 2010
INVENTOR(S)        : Robbin et al.

It is certified that error appears in the above-identified patent and that said Letters Patent is hereby corrected as shown below:

In column 14, line 1-3, in claim 21, delete "The computer readable storage medium of claim 16, further comprising: presenting the non-playable file using a media management application." and
insert -- The computer readable storage medium of claim 16, further comprising: presenting the non-playable file using a media management application. --, therefor.

Signed and Sealed this
Twenty-second Day of November, 2011

David J. Kappos
*Director of the United States Patent and Trademark Office*